United States Patent

[11] 3,580,076

| [72] | Inventor | Eric George Herbert Mobsby<br>Blandford Forum, England |
|---|---|---|
| [21] | Appl. No. | 649,516 |
| [22] | Filed | June 28, 1967 |
| [45] | Patented | May 25, 1971 |
| [73] | Assignee | United Kingdom Atomic Energy Authority<br>London, England |
| [32] | Priority | June 29, 1966, Nov. 21, 1966 |
| [33] | | Great Britain |
| [31] | | 29316/66 and 52098/66 |

[54] ACOUSTIC THERMOMETERS
2 Claims, 2 Drawing Figs.

[52] U.S. Cl............................................... 73/339
[51] Int. Cl.............................................. G01k 11/24
[50] Field of Search.................................. 73/290 (U), 339 (A), 339

[56] References Cited
UNITED STATES PATENTS
3,320,808  5/1967  Boyd............................ 73/339

*Primary Examiner*—Louis R. Prince
*Assistant Examiner*—Denis E. Corr
*Attorney*—Larson, Taylor and Hinds ABSTRACT: A thermometer which measures temperature by the time taken by a sound pulse to travel along a probe. The sound pulse emanates from a transducer coil and magnetostrictive element and travels in two opposite directions. One direction is toward a terminal mass polarized by a magnet where the sound is reflected by the terminal mass and so phased to increase the pulse width at the point of emanation. The other direction of the pulse is toward a probe by way of the magnetostrictive element itself and a transmission line. Reflections from the two ends of the probe are sensed and the time between the reflected pulses from the ends of the probe is measured as function of temperature. The magnetostrictive element is preferably twisted along its length.

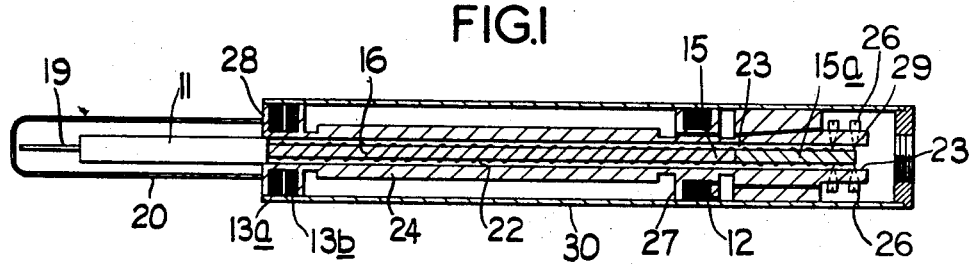
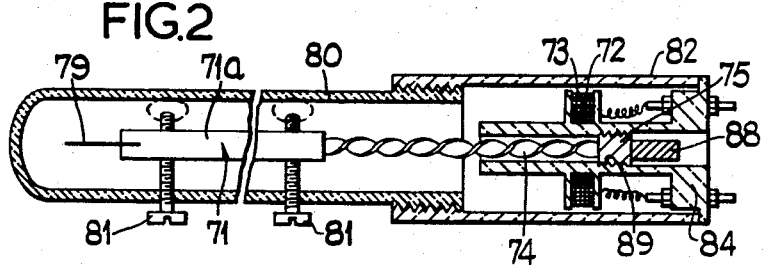

ACOUSTIC THERMOMETERS

BACKGROUND OF INVENTION

The present invention concerns thermometers which measure variation of the speed of sound with temperature by a pulse-echo technique.

In this specification sound and words having equivalent meanings are to be taken as including all mechanical perturbations which are propagated in a wave-type motion at a velocity which is equal to the velocity of sound, that is the word sound does not exclude ultrasonic frequencies.

In these thermometers, a transducer generates a sonic pulse which reflects from two spaced points on a temperature sensing element, possibly the start and finish of the temperature sensing element and the difference in time between the echoes at a common point is a measure of the velocity of sound in the element and thus the mean temperature of the element.

SUMMARY OF INVENTION

In a thermometer according to one aspect of the present invention which measures the speed of sound as an indication of temperature and which comprises a temperature sensing element, and a transducer for causing the transmission of a sound pulse to said element and for sensing echoes from the element, the transducer comprising a magnetostrictive element connected to a transmission line at one end and to a terminal mass at the other end and an electromagnetic coil disposed at said other end for creating a sound pulse in the element.

In previous constructions such as described in British Pat. No. 1,035,763 and in contemporary journals, pulses which travelled along the magnetostrictive member away from the temperature sensor were damped by means of modeling clay. In constructions previously described sonic thermometers which employed an electromagnetic device to launch sonic pulses into a transmission line by applying a pulse to a magnetostrictive member suffered from the disadvantage that a pulse would be launched not only forwards into the transmission line leading to the temperature sensor but also rearwardly. The latter pulse would be reflected and interfere with the forward going pulse. So attempts were made to damp this rearward pulse by attaching a lump of clay to the rearward end of the magnetostrictive member.

According to the present invention a terminal mass is used to reflect any rearward going pulses. Preferably the terminal mass is attached to a housing of the device by a screw connection and may include a permanent magnet for polarizing the magnetostrictive element.

This polarization has been found to overcome a problem in a long term drift experienced after a long disuse and in accordance with another aspect of the present invention, the apparatus has a magnetizing bias means permanently associated with the magnetostrictive element.

This bias means may be an electromagnet if the apparatus is exposed to conditions where loss of magnetization of a permanent magnet is expected and "permanently associated" means that the bias mean is installed in the apparatus and is not a mere premagnetizing device say a bar magnet used to stroke the magnetostrictive element as in prior designs.

The magnetostrictive element can be a Permendur strip in contrast to the nickel tube in British Pat. No. 1,035,763. The reason for this change is basically the difficulty of working Permendur into tubes but strips are not as good as tubes in practice. Some improvement can be made by twisting one end of the strip relative to the other so that the strip spirals along its length, but the optimum form of this apparatus uses Permendur tubes.

The invention is particularly applicable to the thermometer described in British Pat. No. 1,035,763 wherein two pairs of pulses are directed to the probe, the spacing between the pulses in each pair being alternatively greater and less than a preset time.

DESCRIPTION OF THE DRAWINGS

An embodiment of the invention will now be described by way of example with reference to the accompanying drawings in which:

FIG. 1 is a diagrammatic representation of the temperature responsive apparatus for use in conjunction with instrumentation outlined in U.K. Pat. No. 1,035,763, and FIG. 2 is a diagrammatic representation of a thermometer embodying a terminal mass.

DESCRIPTION OF THE PREFERRED EMBODIMENTS

The thermometer of FIG. 1 comprises a sonic pulse transmission line 11, a transducer coil 12, pickup coils 13a and 13b and 4 foot long tail 15, that is a rearward extension from the transmission line. The tail is a one-eighth inch wide and 0.010 inch thick strip element of a magnetostrictive material such as the alloy known as Permendur and the transducer coil cooperates with the strip to generate sonic pulses in the strip which travel forward into the transmission line and rearward down the tail.

The tail ends in a flat pancake coil 15a, the tail having an asbestos string 16 wrapped about it in an open spiral before being coiled into a 1 inch outside diameter coil. The tail is acoustically matched to the carbon rod where they are joined.

The strip passes down a hollow bore 22 of a support into a diametric slot 23 at the end remote from the probe. The coil fits into this slot being with the asbestos a snug fit in the slot. In addition one or more clamps 26 of soft heat resisting material, possibly asbestos are provided along the length of the tail within the bore.

On the outside of the support are formed a winding bobbin 27 for the transducer coil 12 and a common bobbin 28 for the two pickup coils 13a and 13b which are magnetically screened one from the other. These bobbins provide a winding length of under three-eighth inch. The transducer coil consists of 78 turns of 26 w.g. anodized aluminum wire and each pickup coil 1,000 turns of 38 s.w.g. anodized aluminum wire although fewer turns could be used on the pickup coils if an output transformer is used. The bobbins permit the coils to be tight around the tail so as to obtain the best possible coupling. The connections for the coils are taken to a terminal block 29 on the end of the support. Around the support is provided a ceramic housing 30.

The thermometer of FIG. 2 is roughly the same as that of FIG. 1 in that it comprises a transmission line 71, a transducer coil 72, a pickup coil 73 and a magnetostrictive element 74 of say 0.125 inch wide by 0.010 inch thick strip of Permendur. However the element 74 is terminated by a mass 75 immediately adjacent in the axial direction to the coils 72 and 73 but on the side of the coils remote from the transmission line. The transmission line 71 is a 1 foot long graphite rod 71a one-eighth of an inch in diameter with a 3 centimeter long 1 millimeter diameter rhenium wire probe 79 screwed into its end and cantilevered therefrom.

The graphite rod 71a is steadied within a protective sheath or housing 80 for the transmission line 71 by means of graphite set screws 81 disposed at 120° angular intervals along the rod. The sheath or housing could of course by of niobium or other suitable material. This sheath or housing is itself supported by means of a screw connection to a ceramic case 82 which houses a 1 inch diameter ceramic pyrophyllite support 84 for the coils 72, 73.

The magnetostrictive element 74 is twisted to the extent of about two turns per inch and wrapped with asbestos string.

The terminal mass 75 consists of a permanent magnet 88 and a threaded body portion 89 which is joined to the support 84 by a screw connection to give some axial adjustment to the position of the element 74 relative to the coils.

I claim:

1. A thermometer for measuring the speed of sound as an indication of temperature comprising an elongate magnetostrictive element; an electromagnetic transducer for initiating sonic pulses in the magnetostrictive element, said pulses travelling in said element in both forward and rearward directions, a temperature sensor, a transmission line coupled to said element for leading the forward going pulses to said temperature sensor and for returning echoes from said temperature sensor, means for receiving said returning echoes and means for reflecting the rearward going pulses such that the reflected pulses combine with forward going pulses to increase the pulsewidths thereof.

2. A thermometer as claimed in claim 1 in which said means for reflecting the rearward going pulses is a polarizing magnet for said magnetostrictive element.